United States Patent
Lim

(10) Patent No.: US 12,485,864 B2
(45) Date of Patent: Dec. 2, 2025

(54) CONTROL METHOD FOR ELECTRONIC HYDRAULIC BRAKE

(71) Applicant: HYUNDAI MOBIS CO., LTD., Seoul (KR)

(72) Inventor: Jae Il Lim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 595 days.

(21) Appl. No.: 17/968,130

(22) Filed: Oct. 18, 2022

(65) Prior Publication Data
US 2023/0148031 A1     May 11, 2023

(30) Foreign Application Priority Data
Nov. 8, 2021   (KR) .......................... 10-2021-0152022

(51) Int. Cl.
  *B60T 8/94*   (2006.01)
  *B60T 7/12*   (2006.01)
  *B60T 13/68*  (2006.01)

(52) U.S. Cl.
  CPC ...... *B60T 8/94* (2013.01); *B60T 7/12* (2013.01); *B60T 13/686* (2013.01); *B60T 2260/09* (2013.01); *B60T 2270/402* (2013.01); *B60T 2270/404* (2013.01); *B60T 2270/82* (2013.01)

(58) Field of Classification Search
  CPC . B60T 8/94; B60T 7/12; B60T 13/686; B60T 2270/402; B60T 2260/09; B60T 2270/404; B60T 2270/82; B60T 13/66; B60T 17/221; B60T 7/042; B60T 13/662; B60T 17/22; B60T 2220/04; B60T 2270/406
  See application file for complete search history.

(56) References Cited

U.S. PATENT DOCUMENTS

| | | | |
|---|---|---|---|
| 2019/0126899 A1* | 5/2019 | Strehle | B60T 7/042 |
| 2019/0344769 A1* | 11/2019 | Zimmermann | B60T 8/326 |
| 2023/0144112 A1* | 5/2023 | Lim | B60T 13/686 303/2 |

OTHER PUBLICATIONS

Chinese Patent No. CN 109562749 to Zipfel et al published on Apr. 2, 2019.*

* cited by examiner

*Primary Examiner* — Pamela Rodriguez
(74) *Attorney, Agent, or Firm* — Morgan, Lewis & Bockius LLP

(57) ABSTRACT

According to at least one embodiment, the present disclosure provides a control method of an electric hydraulic brake including an auxiliary braking system generating a braking force in a vehicle when a main brake system fails, the control method comprising: determining whether the main brake system fails; opening a rear-wheel High pressure Switching Valve (HSV) connecting a rear wheel of the main brake system and a Low Pressure Accumulator (LPA) of the auxiliary braking system when the main brake system is determined to have failed; determining whether a driver intervenes in braking; and controlling the auxiliary brake system to generate a braking force in the vehicle.

12 Claims, 3 Drawing Sheets

CONTROL METHOD FOR ELECTRONIC HYDRAULIC BRAKE

CROSS-REFERENCE TO RELATED APPLICATIONS

This application is based on, and claims priority from, Korean Patent Application Number 10-2021-0152022, filed on Nov. 8, 2021, the disclosure of which is incorporated by reference herein in its entirety.

TECHNICAL FIELD

The present disclosure relates to a control method for an electric hydraulic brake.

BACKGROUND

Description of this section only provides the background information of the present disclosure without configuring the related art.

An autonomous driving vehicle secures a redundancy function using an auxiliary braking system disposed between a main braking system and a plurality of wheel brake apparatus when the main braking system malfunctions.

An auxiliary braking system of the related art performs 2-channel pressurization/decompression control and 2-channel decompression control. An auxiliary braking system of the related art performs a function of pressurizing/decompressing front wheels and decompressing rear wheels. For this purpose, four input pipelines and four output pipelines, that is, a total of eight pipelines should be connected to the auxiliary braking system. Accordingly, there is a problem in that the manufacturing cost of a brake system increases and assembly is complicated.

When a driver intervenes in braking in a situation in which redundancy is applied, disconnection may occur in braking of a vehicle because it is difficult to adjust a stroke, and as a result, there is a problem in that a braking force is not transmitted well to the vehicle and an accident may occur.

SUMMARY

According to at least one embodiment, the present disclosure provides a control method of an electric hydraulic brake including an auxiliary braking system generating a braking force in a vehicle when a main brake system fails, the control method comprising: determining whether the main brake system fails; opening a rear-wheel High pressure Switching Valve (HSV) connecting a rear wheel of the main brake system and a Low Pressure Accumulator (LPA) of the auxiliary braking system when the main brake system is determined to have failed; determining whether a driver intervenes in braking; and controlling the auxiliary brake system to generate a braking force in the vehicle.

DETAILED DESCRIPTION

Figure 1:
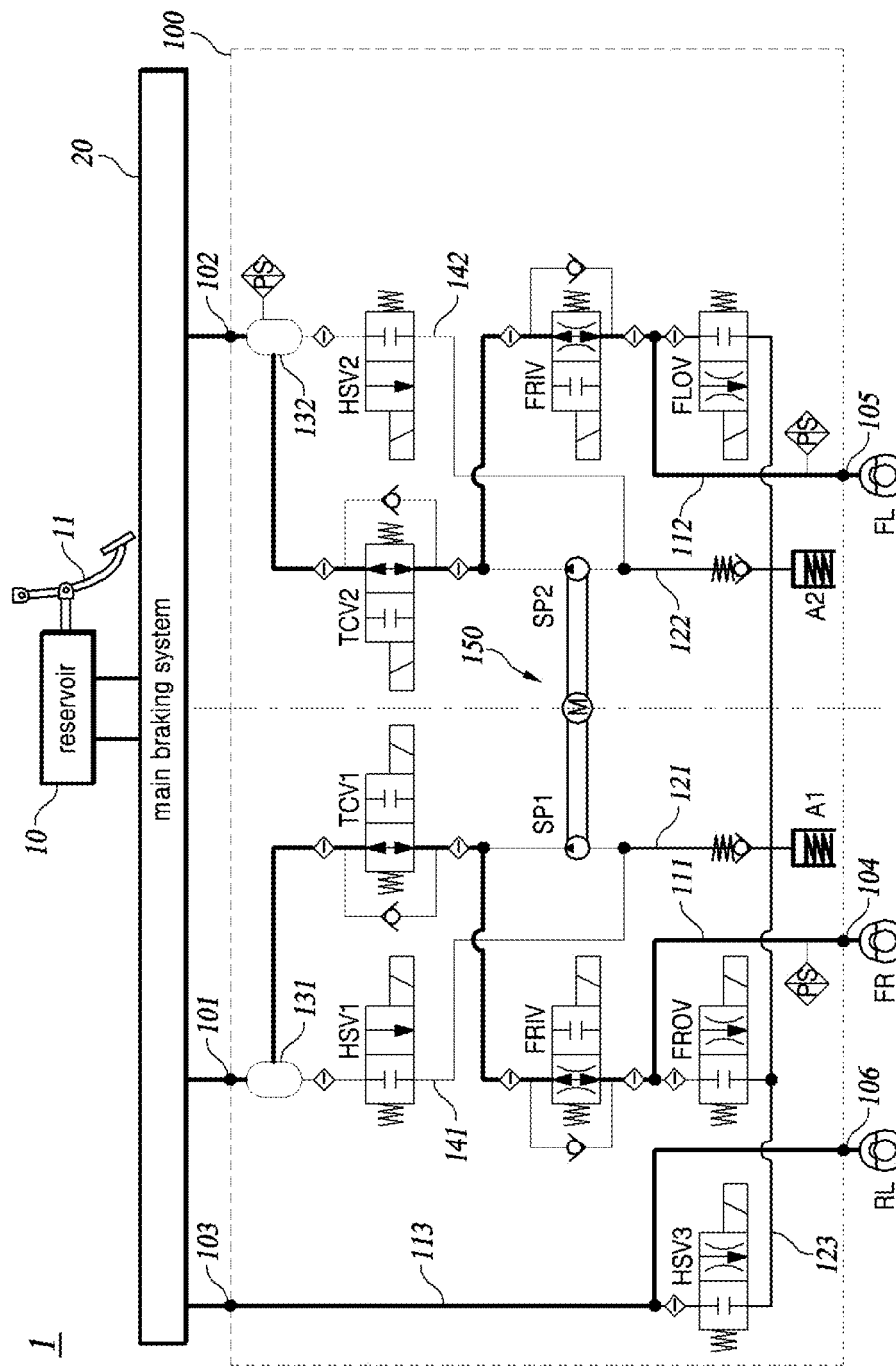
FIG. 1 is a hydraulic circuit diagram of an electric hydraulic brake according to an embodiment of the present disclosure.

A control method for an electric hydraulic brake according to an embodiment can generate a braking force in a vehicle by controlling an auxiliary braking system that can perform 2-channel pressurization/decompression control and 1-channel decompression control.

A control method for an electric hydraulic brake according to an embodiment can use a front wheel-auxiliary braking system and a rear wheel-electric parking brake when a driver intervenes in braking in a redundancy situation.

The objects of the present disclosure are not limited to the objects described above and other objects will be clearly understood by those skilled in the art from the following description.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, alphanumeric codes such as first, second, i), ii), (a), (b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto. The terms such as 'unit,' 'module,' and the like refer to one or more units for processing at least one function or operation, which may be implemented by hardware, software, or a combination thereof.

As for the terms "forward" or "backward" related to the relative positions of lines in the present disclosure, when brake oil flows, the parts disposed closer to a reservoir 10 is described by "forward" and the parts disposed farther are described by "backward". However, this means not only directly continuous forward or backward lines, but lines relatively farther even they are spaced.

FIG. 1 is a hydraulic circuit diagram of an electric hydraulic brake according to an embodiment of the present disclosure.

The hydraulic circuit diagram shown in FIG. 1 only conceptually shows configurations for the convenience of description, and the actual positions of a hydraulic pressure block and lines formed in the hydraulic pressure block may be different. In FIG. 1, an inlet line is indicated by a bold line, an outlet line is indicated by a medium line, and a circulation line is indicated by a thin line.

Referring to FIG. 1, an electric hydraulic brake 1 may include some or all of a reservoir 10, a brake pedal 11, a main brake system 20, and auxiliary braking system 100.

The reservoir 10 is configured to store brake oil therein. The brake pedal 11 can translate a piston disposed in a master cylinder or the main brake system 20 by a stroke of a driver.

A plurality of wheel brakes FR, FL, and RL can generate a braking force at a plurality of wheels using pressure of brake oil discharged from the reservoir 10. When a driver strokes the brake pedal 11, a control unit can sense a braking request of the driver using a Pedal Stroke Sensor (PSS). The control unit sensing a braking request of a driver can generate a brake signal. In this case, the brake signal is an electrical signal that is transmitted to make each of the braking systems 20 and 100 generate a braking force corresponding to a stroke of the brake pedal 11 by a driver in accordance with the stroke.

The main brake system 20 is disposed between the reservoir 10 and the plurality of wheel brakes FR, FL, and RL and may be configured to transmit brake oil discharged from the reservoir 10 to the plurality of wheel brakes FR, FL, and RL and control the hydraulic pressure of the brake oil. When at least some of the components of the main brake system 20 fail, the control unit can transmit an auxiliary braking signal to the auxiliary braking system 100. When an auxiliary braking signal is transmitted to the auxiliary braking system 100 by the control unit, all or some of the components of the auxiliary braking system 100 may be driven. Accordingly, the electric hydraulic brake according to the present disclosure can perform a fail-safe function.

The auxiliary braking system 100 is disposed between the main brake system 20 and the plurality of wheel brakes FR, FL, and RL. When the main brake system 20 fails during autonomous driving or when the main brake system 20 fails in a situation in which a driver intervenes in braking in person, the auxiliary braking system 100 can operate.

The auxiliary braking system 100 may include some or all of hydraulic pressure input units 101, 102, and 103, hydraulic pressure output units 104, 105, and 106, inlet lines 111, 112, and 113, an actuator 150, traction control valves TCV1 and TCV2, inlet valves FRIV and FLIV, outlet lines 121, 122, and 123, outlet valves FROV and FLOV, accumulators A1 and A2, oil chambers 131 and 132, circulation lines 141 and 142, and high pressure switching valves HSV1, HSV2, and HSV3.

One or more hydraulic pressure input units 101, 102, and 103 are disposed on a line through which brake oil discharged from the main brake system 20 flows into the auxiliary braking system 100. The inlet lines 111, 112, and 113 may be fluid-communicated with the main brake system 20 by the hydraulic pressure input units 101, 102, and 103.

One or more hydraulic pressure output units 104, 105, and 106 are disposed on a line through which brake oil discharged from the main brake system 20 flows to the plurality of wheel brakes FR, FL, and RL. The inlet lines 111, 112, and 113 can be fluid-communicated with the plurality of wheel brakes FR, FL, and RL by the hydraulic pressure output units 104, 105, and 106.

The inlet lines 111, 112, and 113 are formed between the hydraulic pressure input units 101, 102, and 103 and the hydraulic pressure output units 104, 105, and 106 and can transmit brake oil discharged from the main brake system 20 to the plurality of wheel brakes FR, FL, and RL.

A first inlet line 111 is configured to transmit some or entire of brake oil discharged from the main brake system 20 to a first wheel brake FR. A second inlet line 112 is configured to transmit a portion or the entire of the brake oil discharged from the main brake system 20 to a second wheel brake FL.

The actuator 150 can increase the pressure of the fluid flowing through the first inlet line 111 and the second inlet line 112. The actuator 150 may include some or all of a first pump SP1, a second pump SP2, a motor formed to drive the pumps SP1 and SP2. An outlet of the first pump SP1 is connected to a point on the first inlet line 111 and an outlet of the second pump SP2 is connected to a point on the second inlet line 112. When one or more of the first pump SP1 and the second pump SP2 is driven, the internal hydraulic pressure of one or more of the inlet lines 111 and 112 connected to the pumps SP1 and SP2, respectively, can be increased.

A first traction control valve TCV1 is disposed at a point on the first inlet line 111 and can adjust opening/closing of the first inlet line 111. The first traction control valve TCV1 may be disposed ahead of a point at which the first inlet line 111 and the outlet of the first pump SP1 are connected. The first traction control valve TCV1 may be formed in a normal open type. Accordingly, in a non-powered mode in which an auxiliary braking signal is not applied, the first traction control valve TCV1 is open. When the first traction control valve TCV1 is closed, a portion of a brake oil pressurized by the first pump SP1 cannot flow backward to the main brake system 20.

A first inlet valve FRIV is disposed at another point on the first inlet line 111 and can adjust opening/closing of the first inlet line 111. The first inlet valve FRIV may be disposed behind a point at which the first inlet line 111 and the outlet of the first pump SP1 are connected. The first inlet valve FRIV may be formed in a normal open type. Accordingly, the first inlet valve FRIV is open in a non-powered mode in which an auxiliary braking signal is not applied. When the first inlet valve FRIV is closed, a portion of brake oil pressurized by the first pump SP1 is not transmitted to the wheel brake FR.

Description of a second inlet line 112, a second traction control valve TCV2, and a second inlet valve FLIV refers to the description of the first inlet line 111, the first traction control valves TCV1, and the first inlet valve FRIV, respectively.

The third inlet line 113 is not pressurized by the actuator 150, and only the first inlet line 111 and the second inlet line 112 are pressurized by the actuator 150. Accordingly, the control method of the auxiliary braking system 100 according to the present disclosure can perform 2-channel pressurization control.

The outlet lines 121, 122, and 123 may be connected to points on the inlet lines 111, 112, and 113 such that at least a portion of the brake oil in the inlet lines 111, 112, and 113 diverges. The outlet lines 121, 122, and 123 may include a first outlet line 121, a second outlet line 122, and a third outlet line 123.

An end of the first outlet line 121 may be connected to a bifurcation on the first inlet line 111 formed behind the first inlet valve FRIV and another end may be connected to an inlet of the first pump SP1.

A first outlet valve FROV is disposed at a point on the first outlet line 121 and the first outlet valve FROV can adjust opening/closing of the first outlet line 121. The first outlet valve FROV may be formed in a normal close type. Accordingly, the first outlet valve FROV is closed in a non-powered mode in which an auxiliary braking signal is not applied. When the first outlet valve FROV is opened, at least a portion of the brake oil pressurized and flowing through the first inlet line 111 can be discharged to the first outlet line 121. That is, hydraulic pressure that is transmitted to the first wheel brake FR can be decreased.

A first accumulator A1 may be further disposed at another point on the first outlet line 121 formed behind the first outlet valve FROV. The first accumulator A1 can temporarily accommodate a portion or the entire of the brake oil transmitted from the first outlet line 121. Accordingly, it is possible to minimize damage that occurs in the first outlet line 121 due to fluctuation of a brake oil. In this case, the damage that occurs in the first outlet line 121 may include fatigue, transformation, abrasion, or the like that occurs in at least a portion of the line when the line is exposed to continuous fluctuation for a long period of time.

The description of a second outlet line 122, a second outlet valve FLOV, and a second accumulator A2 refers to the description the description of the first outlet line 121, the second outlet valve FLOV, and the first accumulator A1, respectively.

An end of a third outlet line 123 may be connected to a point on the third inlet line 113 and another end may be connected to the first outlet line 121. The point at which the third outlet line 123 and the first outlet line 121 may be formed behind the first outlet valve FROV. Accordingly, the brake oil transmitted by the third outlet line 123 may join the brake oil flowing through the first outlet line 121.

The third outlet line 123 may be connected to one or more of the first outlet line 121 and the second outlet line 122. The brake oil transmitted by the third outlet line 123 may be accumulated in at least one of the first accumulator A1 and the second accumulator A2.

The auxiliary braking system 100 according to the present disclosure can generate a maximum braking force of a vehicle by controlling a rear-wheel high pressure switching valve HSV3 connecting the third wheel brake RL and the accumulators A1 and A2 when there is intervention of a driver.

The rear-wheel high pressure switching valve HSV3 is disposed at a point on the third outlet line 123 and can adjust opening/closing of the third outlet line 123. The rear-wheel high pressure switching valve HSV3 is formed in a normal open type. Accordingly, in a non-powered mode, the rear-wheel high pressure switching valve HSV3 is closed.

When the rear-wheel high pressure switching valve HSV3 is opened, at least a portion of the brake oil flowing through the third inlet line 113 diverges to the third outlet line 123. Accordingly, hydraulic pressure that is transmitted to the third wheel brake RL can be decreased.

When there is no intervention of a driver, hydraulic pressure that is supplied from the reservoir 10 to the auxiliary braking system 100 is blocked. Accordingly, the auxiliary braking system 100 according to the present disclosure can replace the braking force of the third wheel brake RL with an electronic parking brake and can transmit the brake oil that is transmitted to the third wheel brake RL to the first wheel brake FR and the second wheel brake FL.

When the rear-wheel high pressure switching valve HSV3 is opened, at least a portion of the brake oil flowing through the third inlet line 113 may diverge to the third outlet line 123 and join the brake oil flowing through the first outlet line 121 and the second outlet line 122. The first accumulator A1 and the second accumulator A2 can temporarily accommodate a portion or the entire of the brake oil transmitted from the first outlet line 121 and the second outlet line 122. Accordingly, the actuator 150 can increase the pressure of a brake oil that is transmitted to the first wheel brake FR and the second wheel brake FL by receiving a brake oil that is transmitted to the third wheel brake RL.

A first oil chamber 131 may be further disposed on the first inlet line 111. In this case, the first oil chamber 131 is disposed ahead of the first traction control valve TCV1. The first oil chamber 131 can temporarily accommodate at least a portion of the brake oil discharged from the main brake system 20 therein. Since hydraulic pressure that is supplied from the reservoir 10 to the auxiliary braking system 100 is blocked when there is no intervention in braking of a driver, at least a portion of the brake oil accommodated in the oil chambers 131 and 132 can be supplied to the actuator 150.

Ends of the circulation lines 141 and 142 are connected to the oil chambers 131 and 132 and the other ends are connected to the outlet lines 121 and 122 adjacent to the inlets of the pumps SP1 and SP2. In this case, a point at which the other ends of the circulation lines 141 and 142 are connected to the outlet lines 121 and 122 may be, preferably, formed behind the accumulators A1 and A2. Accordingly, the brake oil discharged from the accumulators A1 and A2 and the oil chambers 131 and 132 is supplied to the actuator 150, so a sufficient amount of brake oil for driving the actuator 150 can be provided.

A first high pressure switching valve HSV1 is disposed at a point on the first circulation line 141 and can adjust opening/closing of the first circulation line 141. The first high pressure switching valve HSV1 may be formed in a normal close type. Accordingly, in a non-powered mode, the first high pressure switching valve HSV1 is closed. When the first high pressure switching valve HSV1 is opened, at least a portion of the brake oil accommodated in the first oil chamber 131 can be provided to the actuator 150.

The description of a second circulation line 142 and a second high pressure switching valve HSV2 refers to the description of the first circulation line 141 and the first high pressure switching valve HSV1.

Figure 2:
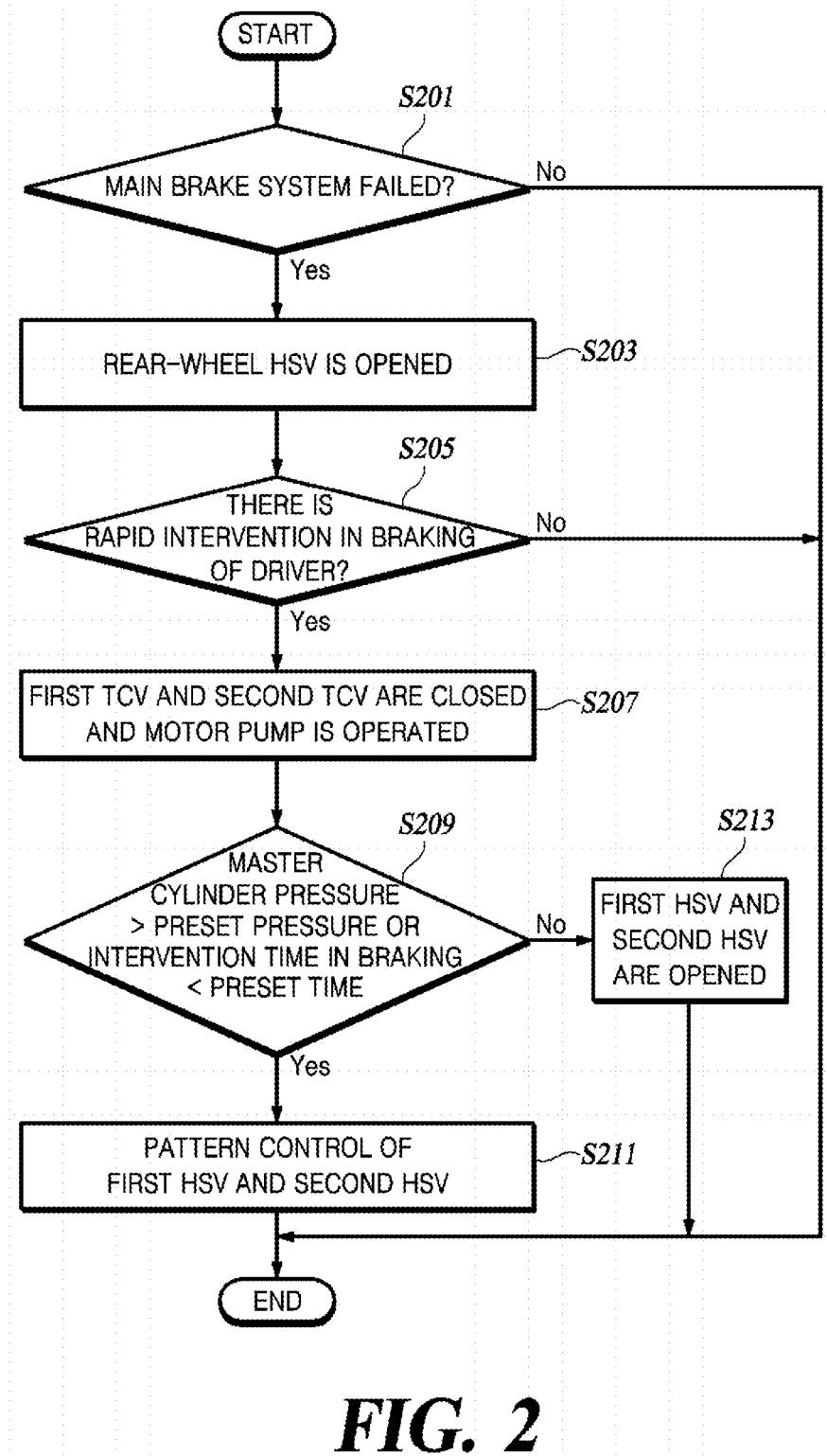
FIG. 2 is a flowchart of a method of controlling an auxiliary braking system of an electric hydraulic brake according to an embodiment of the present disclosure.

FIG. 2 is a flowchart of a method of controlling an auxiliary braking system of an electric hydraulic brake according to an embodiment of the present disclosure.

Referring to FIG. 2, when the main brake system 20 fails during autonomous driving or when the main brake system 20 fails in a situation in which a driver intervenes in braking in person, the auxiliary braking system 100 can operate.

The control unit can determine whether at least some of the components of the main brake system 20 failed (S201). When the control unit determines that the main brake system failed, the control unit can transmit an auxiliary braking signal to the auxiliary braking system 100.

The auxiliary braking system 100 can control the rear-wheel high pressure switching valve HSV3 to open (S203). By opening the rear-wheel high pressure switching valve HSV3, it is possible to improve a braking force of a vehicle removing the hydraulic pressure of the third wheel brake RL and taking the brake oil to the front wheels.

In relation to the point in time when the rear-wheel high pressure switching valve HSV3 is opened, the rear-wheel high pressure switching valve HSV3 can be controlled to be always open when the auxiliary braking system 100 is driven. In this case, pressure is not generated at the third wheel brake RL even though a driver does not intervene in braking. When a driver intervenes in braking, reactivity of the auxiliary braking system 100 can be improved because the accumulators A1 and A2 are immediately charged. However, since the rear-wheel high pressure switching valve HSV3 is always controlled, a current consumption amount may be increased.

In relation to the point in time when the rear-wheel high pressure switching valve HSV3 is opened, the rear-wheel high pressure switching valve HSV3 can be controlled to be selectively opened only when a driver intervenes in braking. It is possible to determine intervention of a driver using a pedal stroke or a pressure sensor of the main brake system 20. In this case, since the rear-wheel high pressure switching valve HSV3 is opened after a driver intervenes in braking, reactivity of removing the pressure generated at the third wheel brake RL may be deteriorated. However, since the rear-wheel high pressure switching valve HSV3 is controlled, when necessary, a current consumption amount can be reduced.

The auxiliary braking system 100 can determine whether there is intervention of a driver in a rapid braking situation (S205). When there is intervention of a driver, the auxiliary braking system 100 can control the first traction control valve TCV1 and the second traction control valve TCV2 to close and can drive the actuator 150 (S207).

The auxiliary braking system 100 can control the first high pressure switching valve HSV1 and the second high pressure switching valve HSV2 to open. That is, the auxiliary braking system 100 of the present disclosure can generate a maximum braking force in a vehicle by opening all of the plurality of high pressure switching valves HSV1, HSV2, and HSV3 and closing all of the plurality of traction control valves TCV1 and TCV2.

When the plurality of high pressure switching valves HSV1, HSV2, and HSV3 are all maintained in an open state in a rapid braking situation, a phenomenon in which the accumulators A1 and A2 are not emptied may occur, depending on a pressure value of the master cylinder. Since the inlets of the pumps SP1 and SP2 are connected with the circulation lines 141 and 142, the hydraulic pressure at the inlets of the pumps SP1 and SP2 may be increased when the brake pedal is being stroked. Accordingly, it is impossible to take a brake oil from the accumulators A1 and A2, so a phenomenon in which the accumulators A1 and A2 are not emptied may occur.

The process in which it is possible to improve a braking force of a vehicle removing the hydraulic pressure of the third wheel brake RL and taking the brake oil to the front wheels by opening the rear-wheel high pressure switching valve HSV3 may usually occur in the early stage of intervention in braking of a driver.

The auxiliary braking system 100 of the present disclosure can control the first high pressure switching valve HSV1 and the second high pressure switching valve HSV2 using the pressure of the master cylinder and the intervention time in braking of a driver so as to effectively generate a braking force in a vehicle. The auxiliary braking system 100 can determine a first condition defined as a case in which the pressure of the master cylinder is larger than a preset pressure and a second condition defined as a case in which the intervention time in braking of a driver is less than a preset time (S209). For example, when the pressure of the master cylinder exceeds 2~5 bar, it may be set the first condition is satisfied, and when the intervention time in braking of a driver is less than 100~300 ms, it may be set that the second condition is satisfied. Here, the intervention time is the duration of braking intervention from the driver.

When one or more conditions of the first condition and the second condition are satisfied, the auxiliary braking system 100 can perform pattern control or sequence control on the first high pressure switching valve HSV1 and the second high pressure switching valve HSV2 (S211). It is possible to solve the phenomenon in which the accumulators A1 and A2 are not empted, solve instability of the rear wheels due to residual pressure of the accumulators A1 and A2, and effectively generate a braking force in a vehicle.

The pattern control is control of opening and closing the high pressure switching valves HSV1, HSV2, and HSV3 in a predetermined cycle. For example, it is possible to repeatedly open and close the high pressure switching valves HSV1, HSV2, and HSV3 by applying duty of 50% thereto.

The sequence control is control of sequentially opening and closing the high pressure switching valves HSV1, HSV2, and HSV3.

When both of the first condition and the second condition are not satisfied, the auxiliary braking system 100 can open the first high pressure switching valve HSV1 and the second high pressure switching valve HSV2 (S213).

Figure 3:
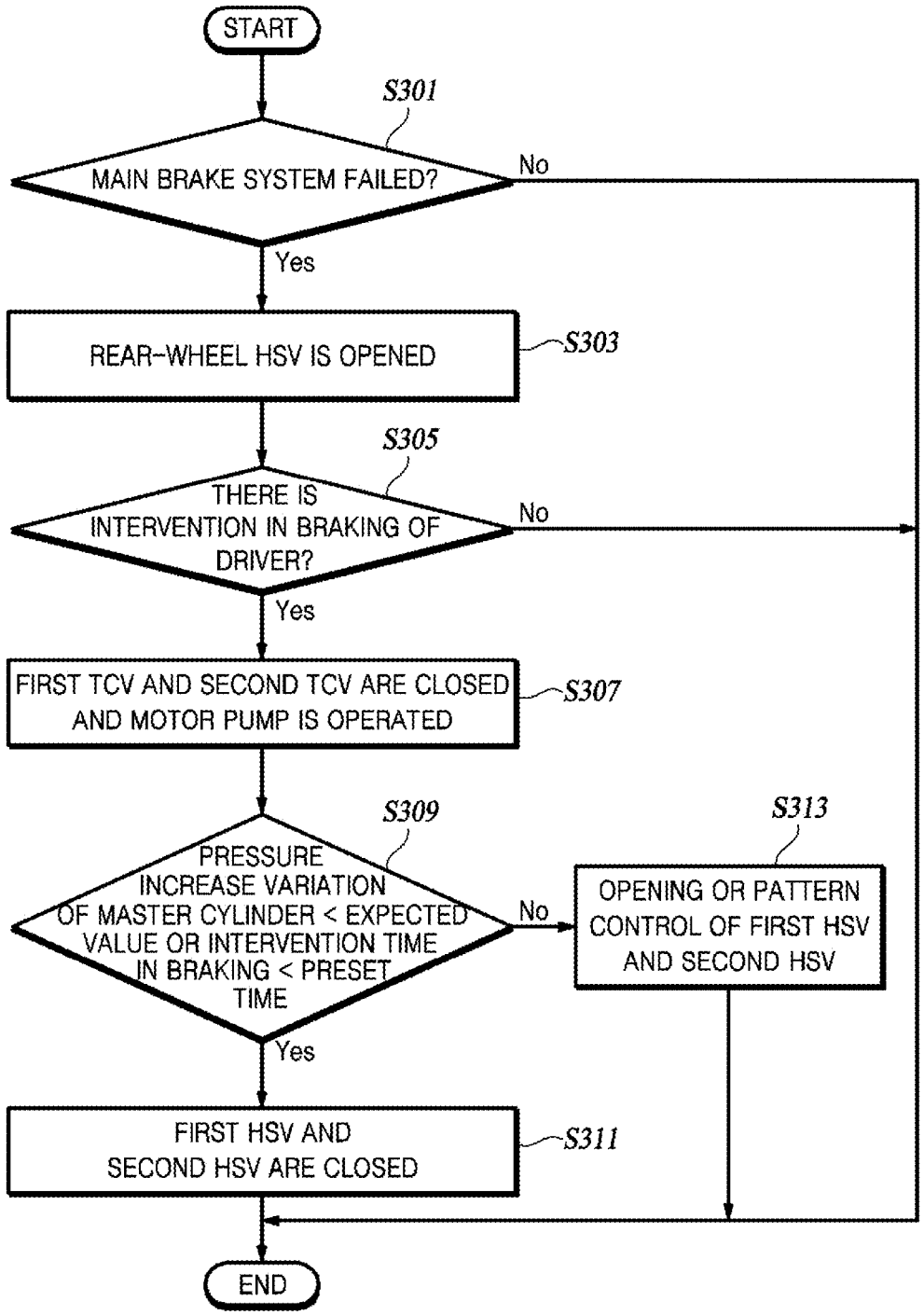
FIG. 3 is a flowchart of a method of controlling an auxiliary braking system of an electric hydraulic brake according to another embodiment of the present disclosure.

FIG. 3 is a flowchart of a method of controlling an auxiliary braking system of an electric hydraulic brake according to another embodiment of the present disclosure.

FIG. 3 is a control method of the auxiliary braking system 100 according to a case in which a driver intervenes in braking in a slow braking situation rather than a rapid braking situation.

The description of a process of determining failure of the main brake system 20 (S301), a process of controlling the rear-wheel high pressure switching valve HSV3 to open (S303), a process of determining whether there is intervention of a driver in a braking situation (S305), and a process of controlling the first high pressure switching valve HSV1 and the second high pressure switching valve HSV2 to close and driving the actuator 150 (S307) refer to the corresponding processes S201 to S207 of FIG. 2.

When the auxiliary braking system 100 controls the high pressure switching valves HSV1, HSV2, and HSV3, disconnection may be generated in pedal feel due to opening of the high pressure switching valves HSV1, HSV2, and HSV3 and movement of a brake oil.

In order to solve this problem, the auxiliary braking system 100 may control the first high pressure switching valve HSV1 and the second high pressure switching valve HSV2 to close. That is, by closing the first high pressure switching valve HSV1 and the second high pressure switching valve HSV2, opening the rear-wheel high pressure switching valve HSV3, and closing all of the plurality of traction control valves TCV1 and TCV2, the auxiliary braking system 100 can smoothen the stroke of a driver in slow braking. Thereafter, it is possible to adjust the pedal feel by opening or performing pattern control on the first high pressure switching valve HSV1 and the second high pressure switching valve HSV2, depending on a pressure variation of the master cylinder.

The auxiliary braking system 100 of the present disclosure can control the first high pressure switching valve HSV1 and the second high pressure switching valve HSV2 using a pressure variation of the master cylinder and an intervention time in braking of a driver so as to smoothen a braking stroke. The auxiliary braking system 100 can determine a third condition defined as a case in which a pressure increase variation of the master cylinder is smaller than a preset value and a fourth condition defined as a case in which the intervention time in braking of a driver is less than a preset time (S309).

When one or more conditions of the third condition and the fourth condition are satisfied, the auxiliary braking system 100 can close the first high pressure switching valve HSV1 and the second high pressure switching valve HSV2 (S311).

When both of the third condition and the fourth condition are not satisfied, the auxiliary braking system 100 can open or perform pattern control on the first high pressure switching valve HSV1 and the second high pressure switching valve HSV2 (S313). That is, when a pressure increase value of the master cylinder is large, it is possible to generate a braking force in a vehicle by controlling the first high pressure switching valve HSV1 and the second high pressure switching valve HSV2.

According to the present disclosure, a control method of an electric hydraulic brake has an effect of being able to reduce the manufacturing cost and increasing convenience of assembly by controlling an auxiliary braking system that can perform 2-channel pressurization control and 1-channel decompression control.

According to an embodiment of the present disclosure, the control method for an electric hydraulic brake can generate a braking force in a vehicle by using a front wheel-auxiliary braking system and a rear wheel-electric parking brake when a driver intervenes in braking in a redundancy situation.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof

What is claimed is:

1. A control method of an electric hydraulic brake including an auxiliary braking system generating a braking force in a vehicle when a main brake system fails, the control method comprising:
    determining whether the main brake system fails;
    opening a rear-wheel High pressure Switching Valve (HSV) connecting a rear wheel of the main brake system and a Low Pressure Accumulator (LPA) of the auxiliary braking system when the main brake system is determined to have failed;
    determining whether a driver intervenes in braking; and
    controlling the auxiliary brake system to generate the braking force in the vehicle.

2. The control method of claim 1, wherein the controlling the auxiliary braking system includes:
    closing a plurality of Traction Control Valves (TCV) that adjusts opening and closing of a front wheel inlet line of the auxiliary braking system; and
    operating an actuator of the auxiliary braking system.

3. The control method of claim 2, wherein the controlling the auxiliary braking system further includes controlling a plurality of high pressure switching valves (HSV1) and (HSV2) disposed on a line configured to connect the actuator and an oil chamber of the auxiliary braking system when an intervention time in braking of a driver is less than a preset time.

4. The control method of claim 3, wherein the controlling the auxiliary braking system further includes determining a first condition defined as a case in which pressure of a master cylinder of the main brake system is larger than a preset pressure and a second case defined as a case in which an intervention time in braking of the driver is less than a preset time.

5. The control method of claim 4, wherein the controlling a plurality of high pressure switching valves (HSV1) and (HSV2) comprises when both of the first condition and the second condition are not satisfied.

6. The control method of claim 4, wherein the controlling a plurality of high pressure switching valves (HSV1) and (HSV2) comprises performing pattern control on the plurality of HSVs when one or more conditions of the first condition and the second condition are satisfied.

7. The control method of claim 3, wherein the controlling the auxiliary braking system further includes determining a third condition defined as a case in which a pressure increase value of a master cylinder of the main brake system is smaller than a preset pressure increase value and a fourth condition defined as a case in which an intervention time in braking of the driver is less than a preset time.

8. The control method of claim 7, wherein the controlling a plurality of high pressure switching valves (HSV1) and (HSV2) comprises closing the plurality of HSVs when one or more conditions of the third condition and the fourth condition are satisfied.

9. The control method of claim 7, wherein the controlling a plurality of high pressure switching valves (HSV1) and (HSV2) comprises opening the plurality of HSVs or performing pattern control on the plurality of HSVs when both of the third condition and the fourth condition are not satisfied.

10. The control method of claim 1, wherein the opening the rear-wheel HSV comprises keeping the rear-wheel HSV open when the main brake system is determined to have failed.

11. The control method of claim 1, wherein the opening the rear-wheel HSV comprises opening the rear-wheel HSV when the main brake system is determined to have failed and there is intervention in braking of the driver.

12. The control method of claim 11, wherein the intervention in braking of the driver is determined using one or more of a pedal stroke and a pressure sensor of the main brake system.

* * * * *